(12) United States Patent
Menezes et al.

(10) Patent No.: US 10,838,923 B1
(45) Date of Patent: Nov. 17, 2020

(54) POOR DEDUPLICATION IDENTIFICATION

(71) Applicant: EMC IP Holding Company LLC, Hopkinton, MA (US)

(72) Inventors: Guilherme Menezes, Santa Clara, CA (US); Abdullah Reza, Santa Clara, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 606 days.

(21) Appl. No.: 14/974,982

(22) Filed: Dec. 18, 2015

(51) Int. Cl.
| | | |
|---|---|---|
| *G06F 7/00* | (2006.01) | |
| *G06F 16/174* | (2019.01) | |
| *G06F 16/17* | (2019.01) | |
| *G06F 16/23* | (2019.01) | |
| *G06F 16/901* | (2019.01) | |
| *G06F 12/02* | (2006.01) | |

(52) U.S. Cl.
CPC ...... *G06F 16/1748* (2019.01); *G06F 16/1727* (2019.01); *G06F 16/2365* (2019.01); *G06F 16/9027* (2019.01); *G06F 12/0238* (2013.01)

(58) Field of Classification Search
CPC .................................................. G06F 12/0238
USPC ......................................................... 707/664
See application file for complete search history.

(56) References Cited

U.S. PATENT DOCUMENTS

| | | | |
|---|---|---|---|
| 8,504,787 B1 | 8/2013 | Graves et al. | |
| 8,612,696 B2 | 12/2013 | Zhu et al. | |
| 8,635,184 B2 | 1/2014 | Hsu et al. | |
| 8,832,034 B1* | 9/2014 | Ramarao | G06F 16/1748 707/664 |
| 2013/0073821 A1* | 3/2013 | Flynn | G06F 3/061 711/162 |
| 2013/0227236 A1* | 8/2013 | Flynn | G11C 16/26 711/165 |
| 2014/0358871 A1* | 12/2014 | Cideciyan | G06F 16/1748 707/692 |
| 2017/0123677 A1* | 5/2017 | Singhai | G06F 16/174 |
| 2017/0147648 A1* | 5/2017 | Aronovich | G06F 16/128 |

FOREIGN PATENT DOCUMENTS

| | | |
|---|---|---|
| WO | WO-2008008183 A2 | 1/2008 |
| WO | WO-2008008183 A3 | 10/2008 |

* cited by examiner

*Primary Examiner* — Eliyah S Harper
(74) *Attorney, Agent, or Firm* — Womble Bond Dickinson (US) LLP

(57) ABSTRACT

Identifying files that do not deduplicate well in a storage system with deduplication facilitates optimizing storage capacity by moving the identified files to less expensive storage without deduplication. Any set of files can be examined to remove files that are identified as files that do not deduplicate well. The process of identification includes arranging the files in a predefined order and using bitmap representations of the unique segments in the files to determine a count of different segments in neighboring next files compared to the previous files, and removing from deduplication any next files that exceed a difference threshold. The bitmap representations of the files allows the identification processes to be performed efficiently for large datasets. Any over-identification of files is minimized by repeating the identification processes on the set of files after arranging them in the reverse order.

18 Claims, 9 Drawing Sheets

POOR DEDUPLICATION IDENTIFICATION

FIELD OF THE INVENTION

Embodiments of the present invention relate generally to data storage systems. More particularly, embodiments of the invention relate to identifying poor files for deduplication in data storage systems using deduplication.

BACKGROUND

In data storage systems the ability to store large amounts of data as efficiently as possible is of paramount importance. One approach to storing data efficiently is to store files using deduplication. In deduplication file systems a file may be split into hundreds of millions of segments during the write process. Any segment shared between the file being written and any other file is not re-written, but rather recorded in the file's offsets in order to optimize storage capacity utilization. Although deduplication storage is more efficient it is generally more expensive per byte of data stored if the deduplication efficiency is low, i.e. if the files do not have a sufficient degree of similarity.

Not all files can benefit from deduplication. For example, in some file systems one group of files may share a sufficient number of segments in common to benefit from deduplication, whereas another file outside of that group may have content that is sufficiently different from that group as to yield little to no increase in storage capacity utilization after its segments are deduplicated. Thus, in the context of deduplication storage systems, it would be more cost effective to move files that cannot benefit from deduplication to a less expensive tier of storage that does not provide deduplication.

Even though deduplication file systems maintain an index that maps any offset of any file to a segment, they typically do not maintain the opposite mapping, i.e. a map from the segment to the file. This is because all of the files in the system can potentially share a segment. Keeping an index data structure per segment would require a prohibitively large amount of storage given that a file system may contain hundreds of billions or more segments.

For this reason, it can be difficult to determine whether any of the segments belonging to one file also belong to other files without comparing the files to one another. Given that a typical file system may contain millions of files, the task of identifying files that cannot benefit from deduplication as compared to other files in the file system can be computationally intensive.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
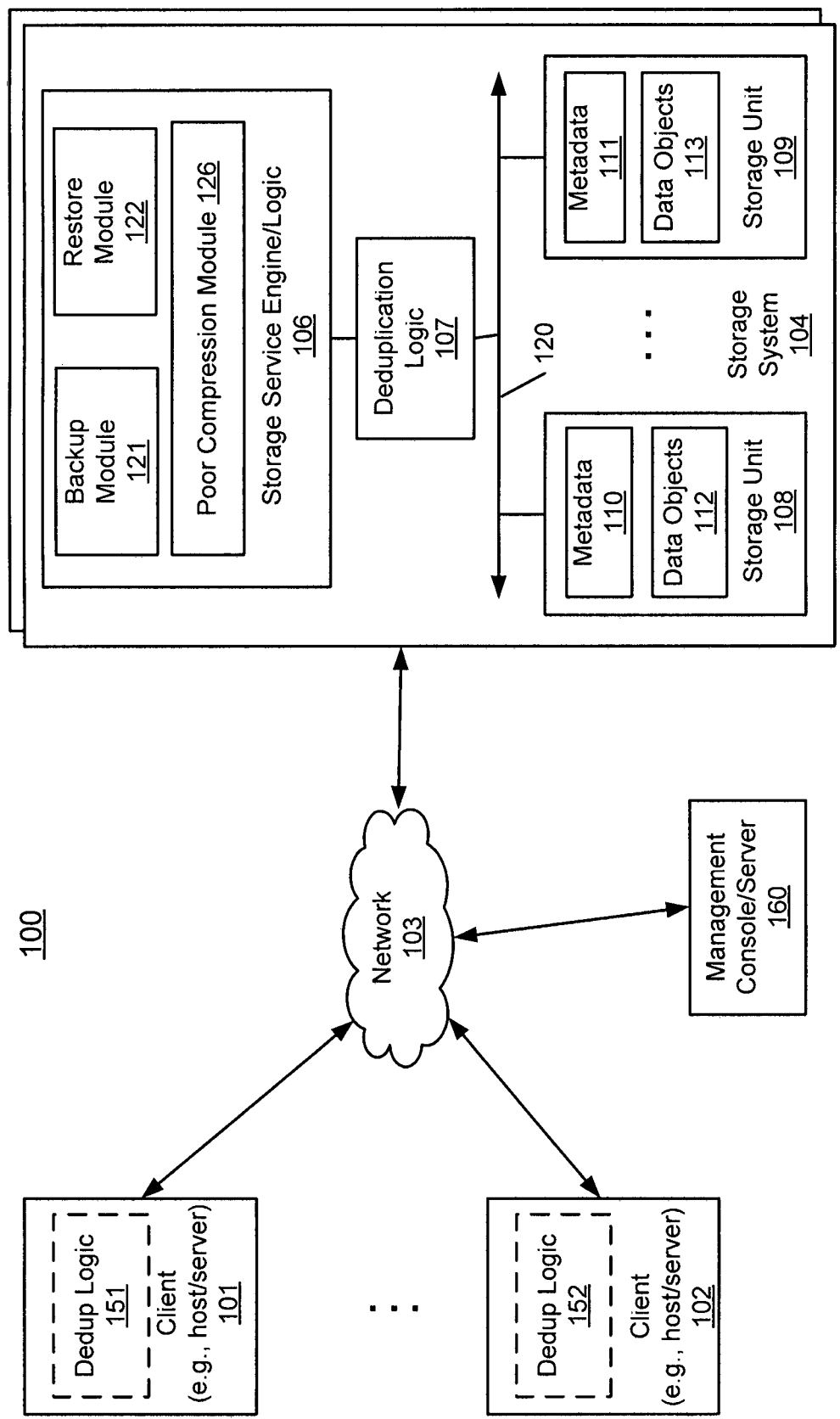
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Identifying files that cannot deduplicate well compared to other files in a file system facilitates optimizing the capacity of a file system. Among other uses, identifying files that cannot deduplicate well can be used to lower the cost of storage by moving those files to less expensive storage that does not provide deduplication.

According to some embodiments, to overcome the challenges of determining whether any of the unique segments belonging to one file also belong to other files, each file's unique segments are represented in memory in a bitmap $B_F$ that represents an approximation of how many unique segments belong to file F. A poor compression module isolates a poor deduplication file from other files in a sequence of files, F1, ..., FN, by comparing each of the neighboring files in the sequence. To reduce the computational load the file comparison is performed using the unique segments of each file in the sequence of files, F1, ..., FN, as represented in memory in corresponding bitmaps $B_{F1}, \ldots, B_{FN}$.

In one embodiment, the sequence of files F1, ..., FN, is organized into any pre-defined order [F1, F2, F3, ..., FN] that can be repeated and reversed. For example, a file system may use a BTree (or any variation) to index the inodes of the set of files {F1, ..., FN}. In so doing the BTree will define a persisted sequence of the files in a pre-defined order [F1, F2, F3, ..., FN] by the way it is constructed. Once defined, the persisted sequence of the files in a pre-defined order [F1, F2, F3, ..., FN] may be processed as needed in the forward or reverse order by scanning the BTree file sequentially in one direction and by scanning again in the opposite direction.

In one embodiment, the unique segments of each file in the sequence of files, F1, ..., FN, are represented in memory in corresponding bitmaps $B_{F1}, \ldots, B_{FN}$ on demand or when the file is initially written to the file system. Each file bitmap $B_F$ represents an approximation of how many unique segments belong to file F. The bitmaps $B_{F1}, \ldots, B_{FN}$ form the basis of the subsequent comparisons of any two neighboring files in the sequence of files, F1, . . . , FN, for any ad-hoc subset of N files F in a file system with data deduplication and segmentation.

In one embodiment, representing the files in memory in corresponding bitmaps $B_{F1}, \ldots, B_{FN}$ facilitates the comparison of neighboring files because files are represented in memory in the bitmap as a set S of segments s, in which each element in the bitmap corresponds to a particular unique segment in the set S.

In one embodiment, a process for comparing neighboring files in the sequence of files, F1, . . . , FN, uses one union set operation to combine the sets of segments belonging to the previous and next neighboring files, and another count set operation to count the number of unique segments belonging to a set of segments. In one embodiment, the process for comparing neighboring files includes a process for comparing the count of unique segments in the combined set of segments to the count of the number of segments in the previous files, and subtracting the previous count from the combined count. In this manner, the process for comparing neighboring files in the sequence of files reveals the count of different segments in each successive next neighboring file.

In one embodiment, the process for comparing the number of different segments in the next neighboring file to the total number of segments in the file determines whether the next neighboring file has exceeded a pre-defined difference threshold. For example, if the number of different segments in the next file in the sequence of files exceeds ninety percent, then the file is determined as possibly too different to compress well with the other files in the sequence of files, and is identified for possible removal from deduplication.

Comparing the difference in the next neighboring file may result in over-identification of files for possible removal from deduplication. This is because as the neighboring files in the sequence of files are compared, segments that compared as different early in the sequence may actually be present in a sufficient number of files later in the sequence to re-identify a file as one that compresses well with the other files in the sequence, i.e. as a good deduplicating file that should remain in deduplicating storage with the rest of the files in the sequence of files.

To address the possibility of over-identification of files for possible removal from deduplication, in one embodiment, the process for comparing neighboring files is repeated in reverse order to determine which files were over-identified for possible removal from deduplication.

In one embodiment, the reverse comparison process computes the number of different segments in the next neighboring file the same as before but in reverse order, processing files [FN, FN−1, FN−2, . . . , F1]. Instead of determining whether the percentage difference exceeds the threshold, the reverse comparison process determines whether the percentage difference of the next file identified for possible removal is now within the threshold, and thus eligible to remain in deduplication storage. In one embodiment, only those files that are determined not to have been over-identified for possible removal from deduplication are actually removed from deduplication.

In one embodiment, each individual bitmap $B_F$ is stored in memory in a bitmap vector B containing a set S of ones and zeroes representing an approximation of how many unique segments belong to file F. In one embodiment, bitmap $B_F$ is stored as a bloom filter with a single hash function that uniformly distributes the set S of ones and zeroes across the bitmap vector B. The bitmap $B_F$ is initially a set of all zeroes. A unique segments belonging to the file F is mapped to a particular bit location in the bitmap vector B using an algorithm to insert(s, S) using the bloom filter with the single hash function and bitmap B:

function insert(segment $s$)

$B[\text{hash}(s)]=1$

The bit value at the B[hash(s)] location in the bitmap vector B is flipped from zero to one in order to represent that an element was added to the set S of ones and zeroes, i.e. that the unique segment s is mapped to that particular bit location in bitmap vector B and belongs to file F.

Bloom filters allow a small number of false positive lookups to occur. In other words a lookup function, lookup (s1, S), might return "true" even if the segment s1 was never inserted into S. For example, if another segment s2 was also inserted into S such that there is a hash function conflict, i.e., hash(s1)=hash(s2), then there can be a false lookup for s1. For identifying files that compress poorly and should be removed from deduplication storage, however, it is not necessary to use a lookup function because there is no need to determine which unique segments belong to file F, but rather only how many. For this reason the probability of a false positive lookup need not be low as long as the probability can be analytically estimated with high confidence.

In one embodiment, a high level of confidence can be achieved when the hash function hash(s) uniformly distributes the ones and zeroes across the entire bitmap B. Because the hash function hash(s) uniformly distributes segments across the bitmap B, the count of the number of unique segments s present in set S in bitmap B can be estimated using a statistical set element count technique expressed as $\text{count}(S)=-M^*\ln(z)$ where M is the size of bitmap B (in bits) and z is the proportion of bits set to zero inside bitmap B relative to M, and S is the set of segments s represented in memory in the bitmap B. For example, if z=0.5 and M=20 then 10 bits have 0 value and 10 bits have 1 value inside bitmap B and the count (S) of the number of elements in set S represented in bitmap B is equal to 10.

In this manner, in one embodiment, storing bitmap $B_F$ as a bloom filter with a uniform distribution of the set of ones and zeroes advantageously facilitates counting the approximate number of unique segments that belong to file F, i.e. the approximate number of bits set to one in the bitmap B, based on the size M of the bitmap B and the proportion z of bits set to zero in the bitmap B relative to M.

In one embodiment, because the bitmap $B_F$ represents an approximation of how many unique segments belong to the file F (as opposed to an exact accounting of which unique segments belong to the file F), the bloom filter size M of the bitmap B can be set to a small enough value for compact representation of bitmap $B_F$ in memory (or on disk) while retaining a high load factor in terms of how many unique segments can be represented in any bitmap B relative to M. In this manner, storing the bitmap $B_F$ in memory requires only a small number of bits per segment without significantly compromising the accuracy of counting the number of unique segments represented in $B_F$.

In one embodiment, further reductions in the size of the bitmap B are obtained using sampling to reduce the number of unique segments represented in bitmap B for file F. In one embodiment, sampling is based on a rate 1/R to sample only one segment in each R segments of file F. In one embodiment, sampling is based on a sampling pattern applied to a content of the sampled segments (as opposed to random sampling). In this manner sampling ensures that a fair representation is obtained of the number of unique segments belonging to file F regardless of the frequency with which any particular segment occurs so as not to significantly compromise the accuracy of bitmap $B_F$.

In one embodiment, various input parameters for the comparison and reverse comparison processes are used to optimize the storage requirements associated with the processes while maintaining processing efficiency. For example, the various parameters can include a global size M for the individual previous and next file bitmaps $B_F$ and the combined previous and next bitmaps, e.g. $B_i$ and $B_{i+1}$, a sampling rate R for sampling the segments in a file F during generation of the individual file bitmaps $B_F$, and a difference threshold t for determining whether the percentage of different segments in the next file exceeds the threshold for compressing well with the other N files F1, . . . FN.

In one embodiment, the file comparison and reverse comparison processes are performed for a pre-selected subset of N files {F1, F2, . . . FN}, where the subset of N files is any ad hoc collection of files F associated with a particular client, tenant, application and the like.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), deduplication logic 107, and one or more storage units or devices 108-109 communicatively coupled to each other.

Storage service engine 106 may represent any storage service related components configured or adapted to provide storage services (e.g., storage as a service) to a variety of clients using any of the access protocols set forth above. For example, storage service engine 106 may include backup logic 121, restore logic 122 and poor compression module/logic 126.

In one embodiment, backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into data objects 112/113 in the form of multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files 112/113 are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In response to a data file to be stored in storage units 108-109, according to one embodiment, a poor compression module 126 is configured to generate bitmaps for any one or more N files in a file system subject to deduplication. In one embodiment, the bitmaps can be generated on demand or at the time they are written. The types of files for which bitmaps are generated include any subset of files subject to compression, for example, files that are stored using data deduplication (as described in further detail below).

In one embodiment, the poor compression module logic 126 is further configured to compare any two neighboring files a sequence of files F1, . . . , FN based on the bitmap representations $B_{F1}$ . . . $B_{FN}$ of the files, and various input parameters, such as a threshold difference t against which the files in the sequence of files F1, . . . , FN are processed in order to identify whether they are poor compression files.

Additional details of the file comparison processes performed by the poor compression module 126 are described with reference to FIGS. 2-6.

In one embodiment, referring back to FIG. 1, any of clients 101-102 may further include an optional deduplication logic (e.g., deduplication logic 151-152) having at least a portion of functionalities of deduplication logic 107. Deduplication logic 151-152 are configured to perform local deduplication operations, respectively. For example, prior to transmit data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

In one embodiment, storage system 104 further includes a storage manager or storage controller (not shown) configured to manage storage resources of storage system 104, such as, for example, storage space and processing resources (e.g., processor, memory, network resources). An administrator of management console or server 160 may access the storage manager or controller remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Figure 2:
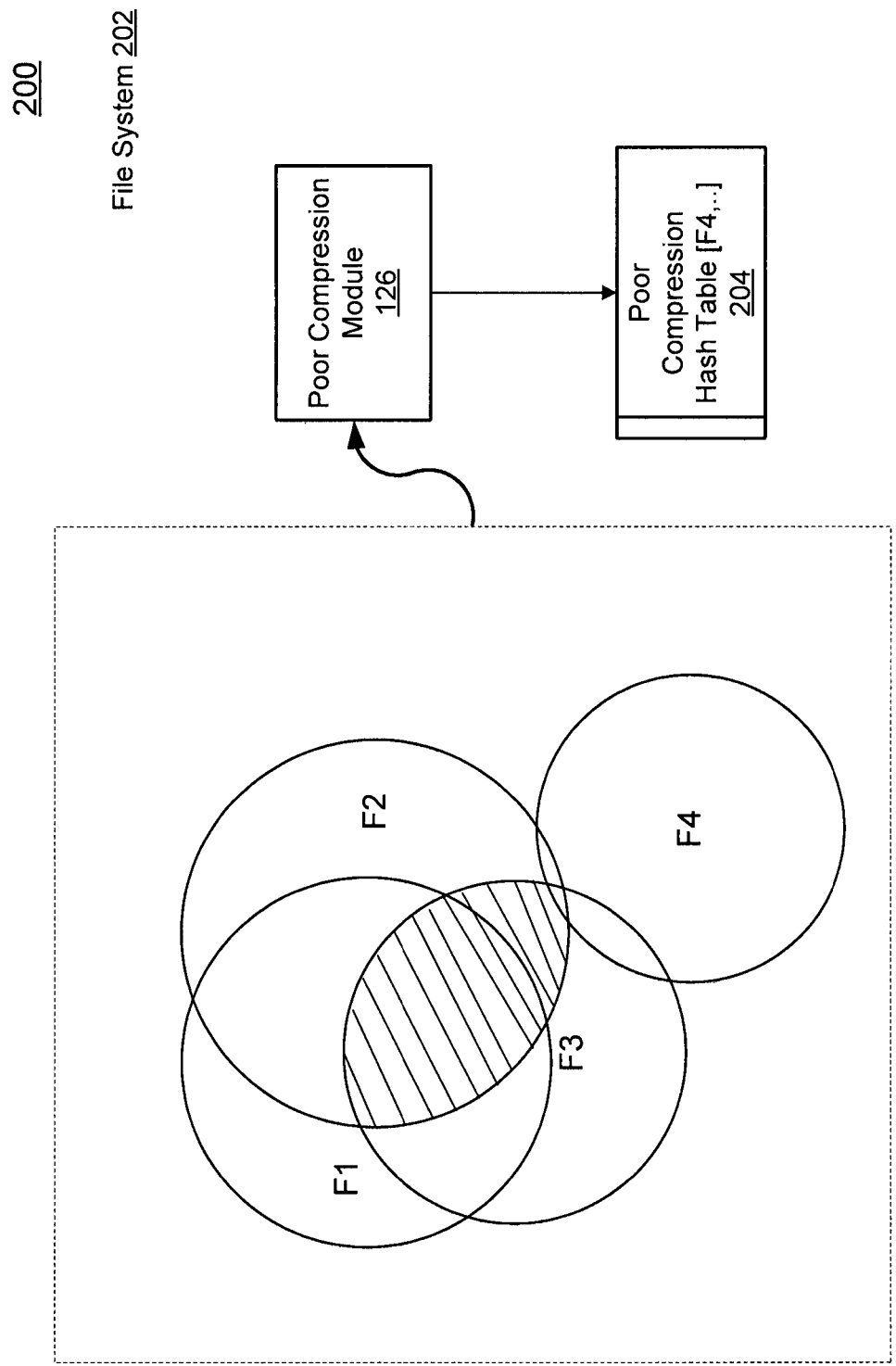
FIG. 2 is a block diagram illustrating an exemplary poor deduplication file identification in a storage system according to one embodiment of the invention.

FIG. 2 is a block diagram illustrating further details of storage system 200 including a file system 202 having the poor compression module/logic 126, including a poor compression hash table 204 in which to accumulate file information for files identified as exceeding the threshold difference, and classified as files that should be removed from deduplication. In the illustration in FIG. 2, a set of four files [F1, F2, F3, F4] is shown in a Venn diagram to demonstrate that a subset of files, [F1, F2, F3] share content and that a fourth file [F4] shares very little content with [F1, F2, F3]. The poor compression module logic 126 is able to process the set of files [F1, F2, F3, F4] and identify, based on their bitmap representations in memory, which share sufficient content to remain in deduplicating storage and which should be removed to a less expensive non-deduplicating storage tier.

Figure 3:
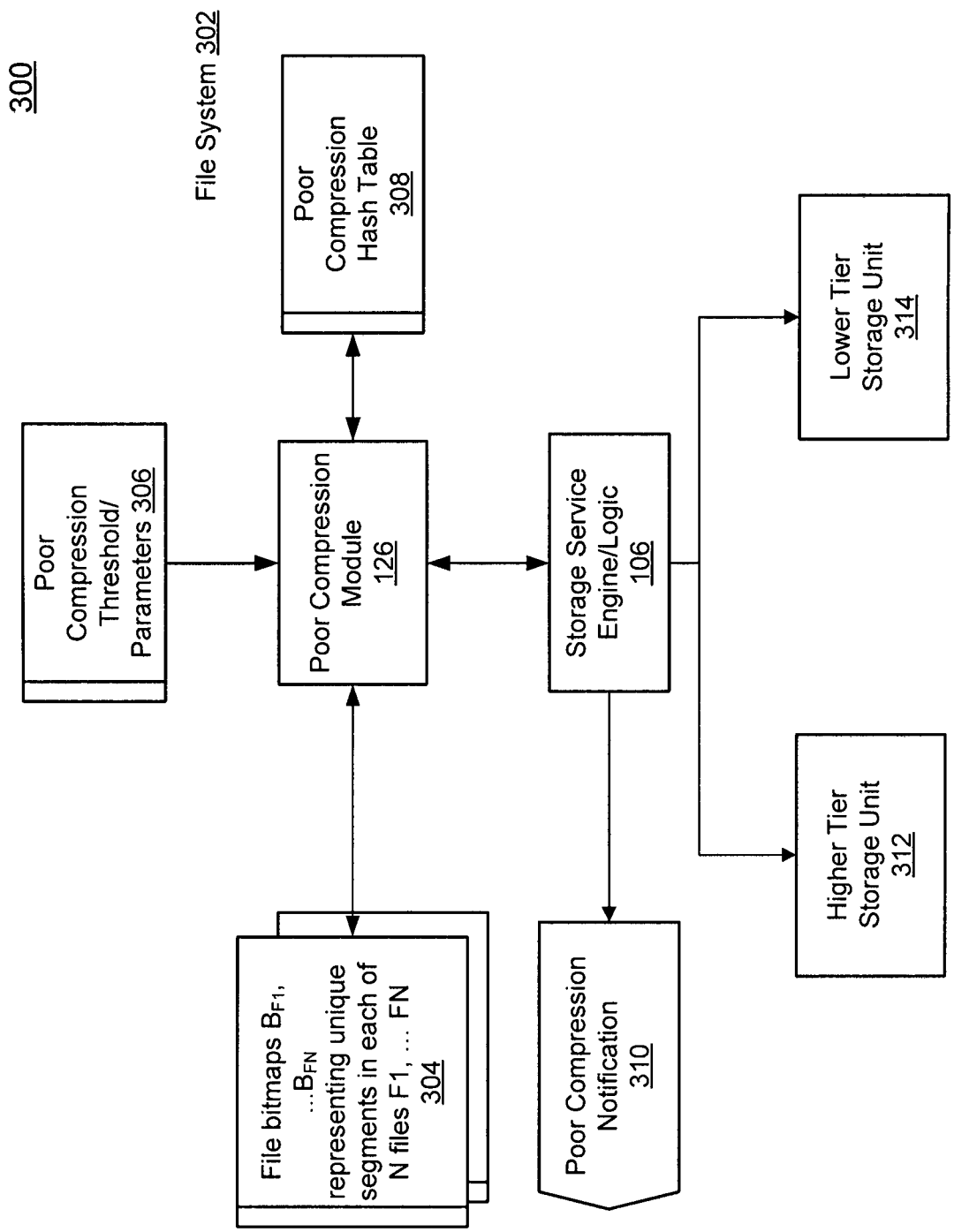
FIG. 3 is a block diagram illustrating a file system for identifying poor deduplication files in a storage system according to one embodiment of the invention.

FIG. 3 is a block diagram illustrating further details of storage system 200 including a file system 302 having the poor compression module/logic 126, poor compression hash table 308 in which to record the information identifying which files to remove from deduplication. The file system 302 includes the file bitmaps representing the unique segments belonging to each of the files in a set of files for which the poor compression files are to be identified. In one embodiment, the poor compression module 126 includes a process by which the storage system 300 prepares the files for identifying poor compression files by processing each file F in a subset of N files F1, F2, ... FN to generate and store bitmaps $B_{F1}, \ldots B_{FN}$ 304 in persistent storage, either on disk or in memory. Each bitmap $B_F$ represents an approximation of how many unique segments belong to file F. The file F can be processed on demand or when the file is initially written to the file system 302. Each bitmap $B_F$ need only be generated again if the file is changed. The subset of N files F1, F2, ... FN can be any ad hoc set of N files, such as those for a particular client or associated with a tenant ID and the like. Additional details of the bitmap generation portion of module/logic 126 is described with reference to FIG. 5.

The poor compression identification portion of logic 126 is a process by which a storage system 300 including file system 302 identifies the percentage difference in the content of a file compared to the other files for any given subset of N files {F1, F2, ... , FN} in the context of data deduplication. If the percentage difference exceeds a poor compression threshold parameter 306, then logic 126 either generates a notification 310 of poor compression for the identified file and/or adds the file to a poor compression hash table 308 of files that should be classified for removal from deduplication, such as by moving them from a higher tier storage unit 312 to a lower tier storage unit 314.

In view of the difficulty in determining the differences in content between one file and another file (due to the magnitude of the amount of files and data stored in the storage system), the percentage difference of a file identified for removal from deduplication is instead estimated based on the bitmaps $B_{F1}, \ldots B_{FN}$ 304 for the subset of N files {F1, F2, ... , FN}. In a typical embodiment, the bitmaps $B_F$ are fetched from persistent storage or, if needed, are newly generated for any files F for which bitmaps have not yet been generated at the time the poor compression module/logic 126 is being performed. Further details of the poor compression module/logic 126 are described with reference to FIGS. 4a-4b and FIG. 6.

In one embodiment, the poor compression module/logic 126 receives as input various parameters 306 that control how the poor compression module/logic 126 is implemented. In addition to the aforementioned threshold difference input parameter, the poor compression module 126 can receive an identification of any ad hoc set of N files {F1, F2, ... , FN} for which poor compression file identification is to be performed, a sampling rate R for generating the bitmaps $B_F$, and the global bitmap size M which defines a uniform size for each of the bitmaps used to store the bitmaps, including the combined bitmap for the neighboring previous and next files, and the global bitmap $B_G$ into which all of the bitmaps $B_{F1}, \ldots B_{FN}$ 304 are consolidated during the poor compression identification processes as described in further detail in FIG. 4. The poor compression module/logic input parameters 306 are summarized in Table 1.
1. A set of N files {F1, F2, . . . , FN}.
2. A threshold value t for determining whether the percentage differences in the number of segments in a file exceeds the threshold for compression.
3. The sampling rate R for traversing the unique segments during generation of the bitmap for a file F.
4. The global bitmap size M for the bitmaps B used to generate the bitmaps $B_F$.

Table 1

FIGS. 4a-4b, 5 and 6 are flow diagrams illustrating processes 400/500/600 for identifying files that are poor compression files according to one embodiment of the invention. The processes 400/500/600 may be performed by processing logic that includes hardware (e.g. circuitry, dedicated logic, etc.), software (e.g., embodied on a non-transitory computer readable medium), or a combination thereof. For example, poor compression identification module 126, as illustrated in FIGS. 1 and 2, can perform processes 400/500/600.

Because the identification of the differences in the number of unique segments between two neighboring files in the a set of N files is based on a count of the number of unique segments belonging to a file, the process 400 to isolate poor compression files represents each file F in memory as a set of segments S such that $S=\{s|s$ is a segment of file $F\}$ where the segments refers to a fingerprint of the content of a unique segment s that belongs to file F and is stored once in a file system with deduplication. It should be noted that throughout this description references to segments refer to a fingerprint of the content of a segment and not to the actual segment stored in the file system unless otherwise specified.

Representing F in memory as a set S of unique segments s is advantageous for comparing the differences between files because each of the elements in the set can be counted in order to determine how many unique segments s belong to one file as compared to how many unique segments s belong to another file. Another advantage is that the representation of one file F in memory can be combined with one or more other files using a union set operation, and in which the combined is also a set S containing all of the segments in the combined files.

In actuality, not all of the unique segments s in file F are represented since the storage required to represent all unique segments for every file for which poor compression identification is requested would be too large. Instead, the unique segments selected for inclusion into the set are representative of the number of unique segments belonging to a file F, and the resulting bitmap $B_F$ is a set of elements having binary values of ones and zeroes that can be used to count and combine the unique segments contained in the files to efficiently determine the differences between one file and the next.

In one embodiment, an efficient data structure for compactly representing in memory a set S of segments s is a bloom filter, referred to as a bitmap B, such that inserting a segment s into the bloom filter results in a corresponding bitmap element bit value of "1."

The process 400 begins at 402 to identify an ad hoc collection or subset of N files F1, . . . FN in the storage system for which poor compression identification is performed. The identification of the set of N files can be based on an input parameter that specifies which subset of N files for which bitmaps are to be generated in preparation for poor compression identification.

Figure 5:
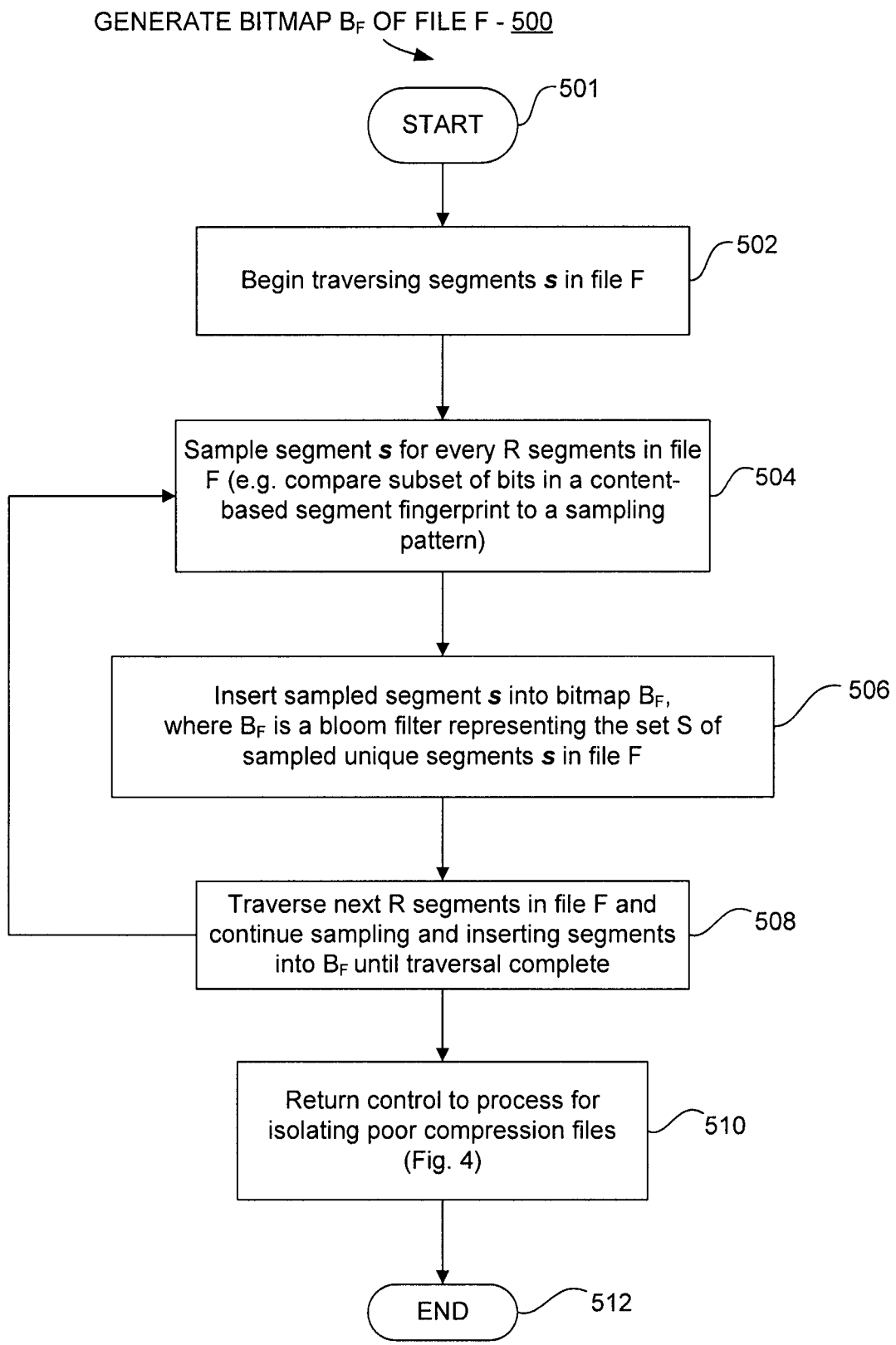
FIG. 5 is a flow diagram illustrating processes for identifying poor deduplication files in a storage system according to one embodiment of the invention.

At 404 the process 400 generates the bitmap $B_F$ representing the unique segments in file F (as described in further detail in process 500 with reference to FIG. 5). In one embodiment, process 400 compresses the bitmap $B_F$ efficiently by using a sparse representation. For example, instead of representing the bitmap $B_F$ as a sequence of bits 1s and 0s, if the number of 1s is very low compared to the number of 0s, then the is bits can be represented as a series of offsets inside the bitmap $B_F$. For example, if only bit offset 2 and bit offset 3 are set to 1 in a bitmap $B_F$ of size 4, the bitmap $B_F$ is represented compactly as a sequence [2,3] instead of [0,1,1,0].

In one embodiment, the process 400 increases the compression of the bitmap $B_F$ generated (with reference to FIG. 5) by applying a form of encoding to the bitmap $B_F$, such as delta encoding, in which case the offset of each 1s bit in the bitmap $B_F$ is represented using differences. For example, [2,4] can be represented as [2,2], since 4=2+2. Other compression techniques that the process 300 can employ include any kind of lossless data compressor such as those from the Lempel-Ziv family of compressors.

An advantage of using process 400 to generate a bitmap for file F (as described with reference to FIG. 5) is that the actual amount of data required to store the bitmap $B_F$ is proportional to the number of sampled segments in the file F. Thus, smaller files will be measured with a bitmap $B_F$ that requires a smaller number of sampled segments and thus a very small amount of storage, while bigger files will be measured with a bitmap $B_F$ requiring a greater number of sampled segments and thus a larger amount of storage.

Once the bitmap $B_F$ is generated (with reference to FIG. 5), control returns to process 400 which continues at 406 to initialize P, a hash table for accumulating those files that are identified as having poor compression and unable to benefit from deduplication. Process 400 continues at 408 to initialize a global bitmap $B_G$ in preparation for the first stage of comparison of neighboring files in the set of N files in a forward direction. The global bitmap $B_G$ is generated incrementally as the files in the set of N files are processed in the forward direction. As such, the bitmap $B_G$ becomes the global bitmap that eventually represents every unique segment contained in every file F in the set of N files. It is this global bitmap against which each successive next file in the sequence of files is compared in order to determine the differences between the files.

At 410 the process 400 commences looping through a sequence of N files in a forward order, comparing neighboring files by counting the difference between the count of segments in a next file but not present in the previous files. Comparing neighboring files is based on a comparison between the bitmap $B_F$ for the next file in the sequence and the global bitmap $B_G$ for the previous files in the sequence, and into which all of the files in the sequence of files are eventually combined. In the following discussion, all references to the next file is to the next consecutive file in the current order of the sequence of N files, in either the forward order or the reverse order.

In one embodiment, the difference in the next file as compared to the previous files in the sequence of files is counted by taking the union of the bitmap $B_F$ for the next file in the sequence and the global bitmap $B_G$ of the previous files, and subtracting the count of segments in the next file from the count of segments in the union of the next file and the previous files, i.e. the union of the bitmap $B_F$ and the global bitmap $B_G$. For example, using the bitwise "or" operation, the process 400 computes the union of the bitmap $B_F$ and the global bitmap $B_G$ as follows:

$$B_F \cup B_G\ B_F | B_G$$

In one embodiment, at decision block 412, the process 400 computes the percentage of different segments in the next file compared to the total number of segments in the next file to arrive at a difference percentage of the next file. The process 400 determines whether the difference percentage exceeds a threshold t of difference for compression using deduplication. If the difference percentage exceeds the threshold, then at 414 the process 400 inserts the next file into the hash table P as having been identified as a possible candidate for removal from deduplication, i.e. poor compression identification.

The looping processes conclude at 416 in which the next file just processed is accumulated into the global bitmap $B_G$, e.g., $B_G = B_F | B_G$, in preparation for the comparison of the next file in the sequence of files when the loop continues.

The process 400 continues to loop through the sequence of N files in the forward order at 410 through 416 until complete.

Figure 4A:
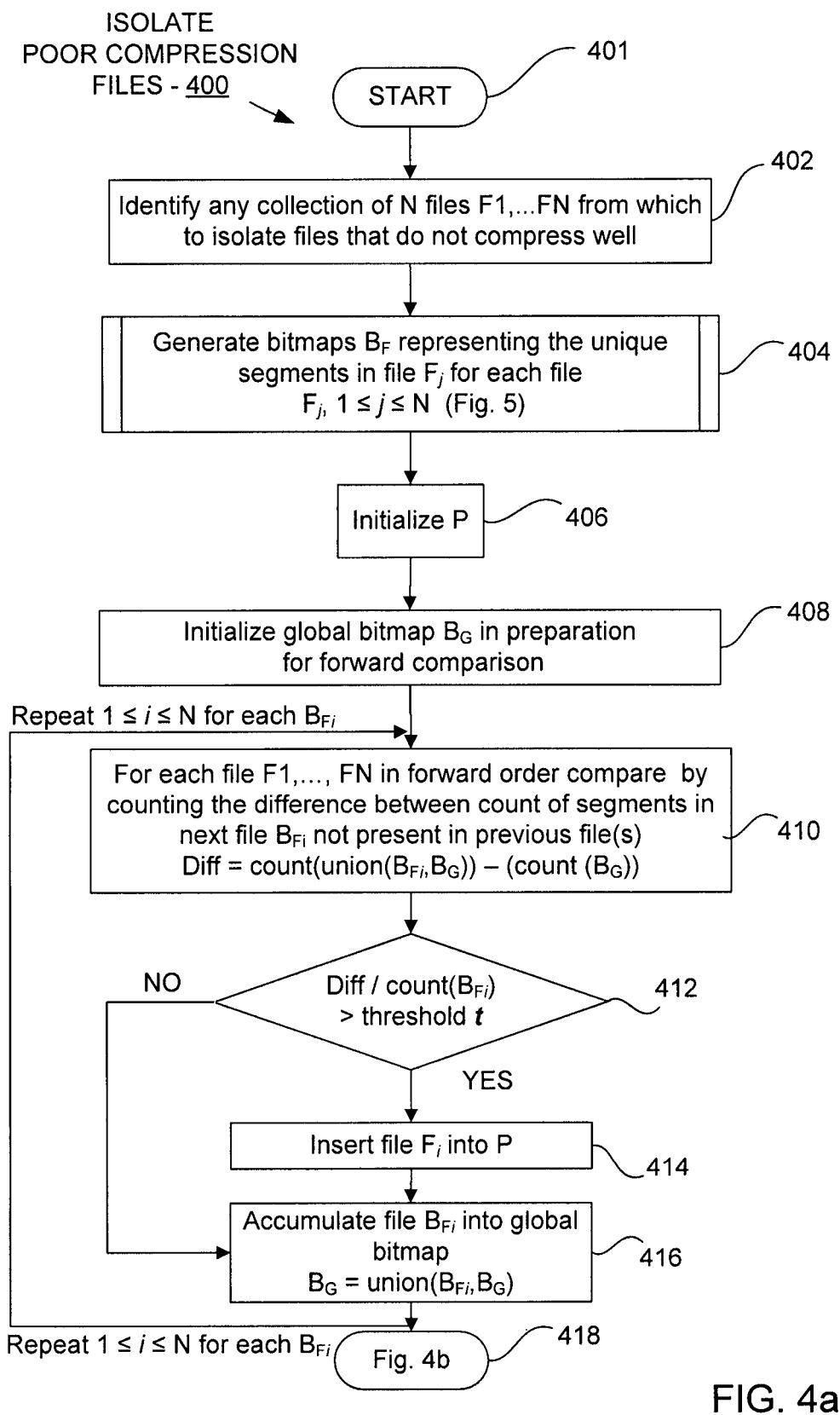
FIGS. 4a-4b are flow diagrams illustrating processes for identifying poor deduplication files in a storage system according to one embodiment of the invention.
Figure 4B:
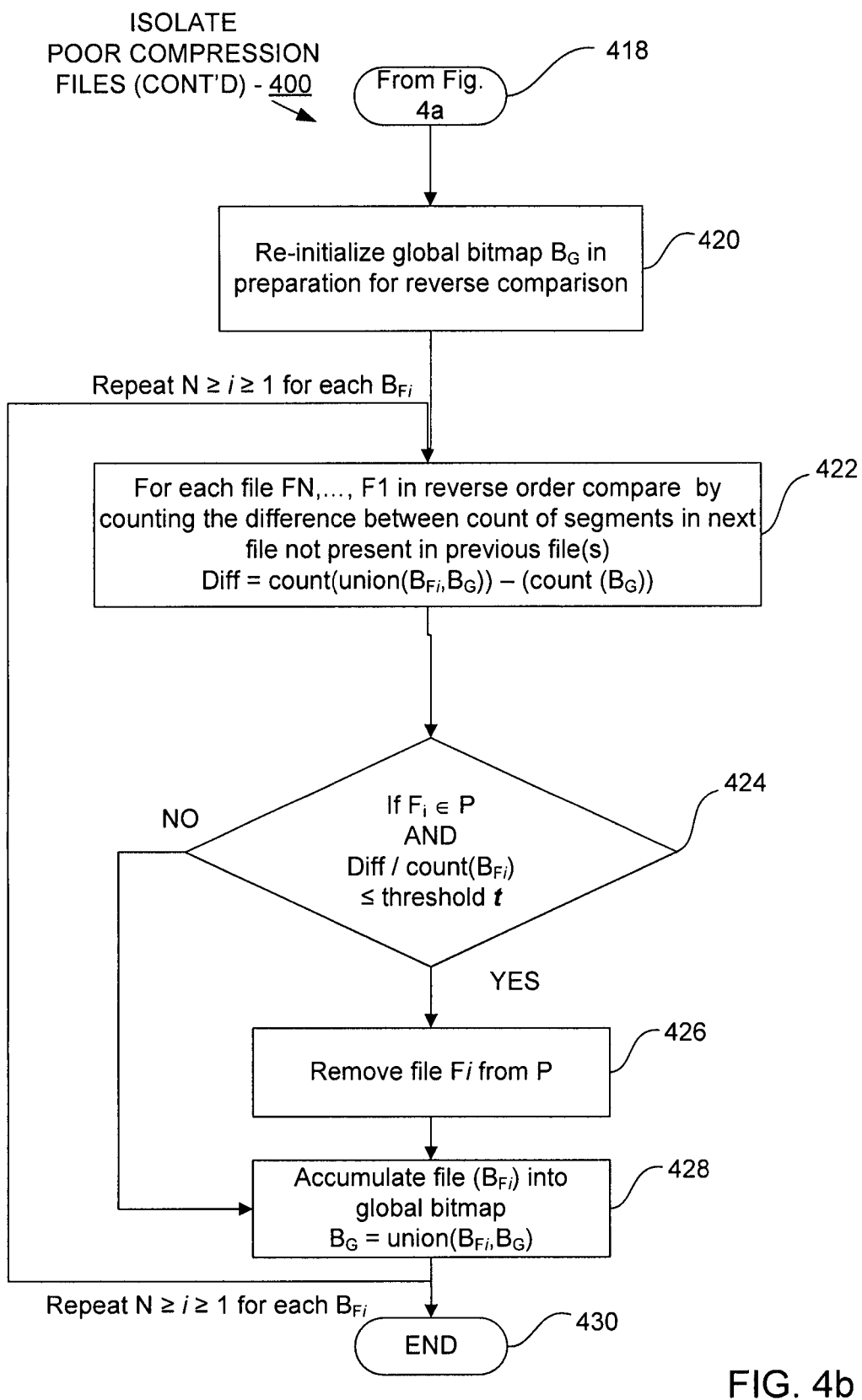

In one embodiment, at 420, the process 400 continues with reference to FIG. 4b, in which the global value of the bitmap $B_G$ is re-initialized in preparation for a reverse comparison of the differences between the files in the sequence of N files, but this time in a reverse order.

As before, the difference is counted by taking the union of the next file in the sequence of files and the previous neighboring files (as incrementally accumulated into global bitmap $B_G$), and subtracting the count of segments in the next file from the count of segments in the union of the next file and the previous neighboring files.

In one embodiment, at 424, the process 400 computes the percentage of different segments counted in the next file compared to the total number of segments in the next file to arrive at a difference percentage of the next file. Instead of determining whether the difference exceeds the compression threshold t, the process 400 instead determines whether, for files previously identified for removal from deduplication, if this new difference percentage is now determined to be within the compression threshold t. If this new difference percentage in the reverse direction is within the threshold, then at 426 the process 400 removes the next file Fi from the hash table P as a possible candidate for removal from deduplication.

As with the first looping process, processing the sequence of files in reverse order concludes with accumulating the next file just processed into the previous files, i.e. into the global bitmap $B_G$ for all of the previous files processed thus far. The process 400 continues to loop through the sequence of N files in the reverse order at 422 through 428 until complete.

In one embodiment, at the end 430 the contents of the hash table P should only contain those next files that should be removed from deduplication because their differences from their neighboring files in the N files being processed exceed the compression threshold t. In one embodiment, the information in hash table P is reported to the storage administrators, users, or the like. Alternatively, the information in hash table P is used to remove the identified files from the deduplication storage system as described with reference to FIG. 6.

With reference to FIG. 5, the process 404 (from FIG. 4a) for generating the bitmap for file F is illustrated in further detail in process 500 beginning at 502 with commencing traversing all segments s belonging to file F. In one embodiment, the traversal of the segments in file F is performed at 504 through 508 using a sampling technique until traversal is complete. For example, in one embodiment, at 504 the process 500 samples one segment s for every R segments in file F.

In one embodiment, to insure proper sampling, process 500 uses a content-based sampling technique instead of sampling randomly (such as when using rand( ) function). A content-based sampling technique selects the segment for insertion into bitmap $B_F$ only if the segment fingerprint matches a particular content-based fingerprint-sampling pattern.

In this manner, the process 500 consistently samples segments without being affected by the frequency with which the segment belongs to files in the storage system. For example, if segment s1 belongs to files F1, . . . , FN with a higher frequency than segment s2, content-based sampling avoids the possibility that segment s1 is sampled more often than segment s2.

In one embodiment, after a unique segment of file F is sampled, at 506 the process 500 inserts the sampled segment into bitmap $B_F$ using a corresponding bloom filter insertion hash function. The process 500 continues at 508 repeating traversing and sampling until traversal is complete. The process 500 returns control at 406 in process 400 of the identification of poor compression files in FIG. 4a.

Figure 6:
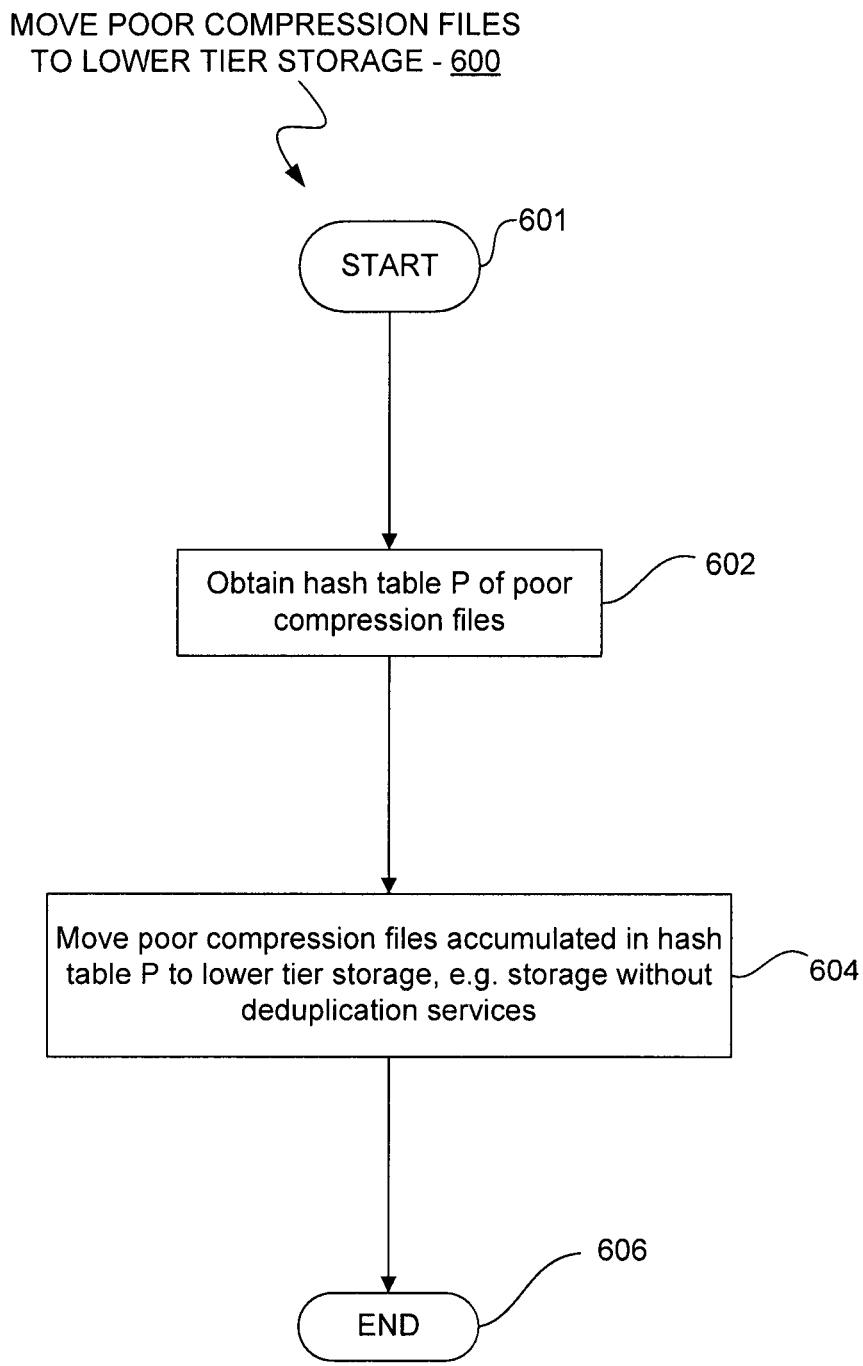
FIG. 6 is a flow diagram illustrating processes for identifying poor deduplication files in a storage system according to one embodiment of the invention.

FIG. 6 is a flow diagram, illustrating certain aspects of process 600 for moving any files identified as poor compression files in a subset of N files F1, F2, . . . FN from deduplicating storage tiers to a less expensive non-deduplicating storage tier rate according to one embodiment of the invention.

In one embodiment, at process 602, the process 600 obtains the current hash table P of poor compression files that was generated in process 400 described with reference to FIG. 4. At process 604, the process 600 continues to move the poor compression files accumulated in hash table P to a lower tier storage, such as a class of storage without deduplication services. In an alternate embodiment, the process 600 can include a notification process to issue a notification to the client, user, or storage administrator that the identified file(s) in hash table P should be or have been removed from deduplication.

In the foregoing description note that some or all of the components as shown and described above, such as the poor compression module/logic 126 in FIGS. 1 and 2 and associated logic as described in FIGS. 2-6, may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
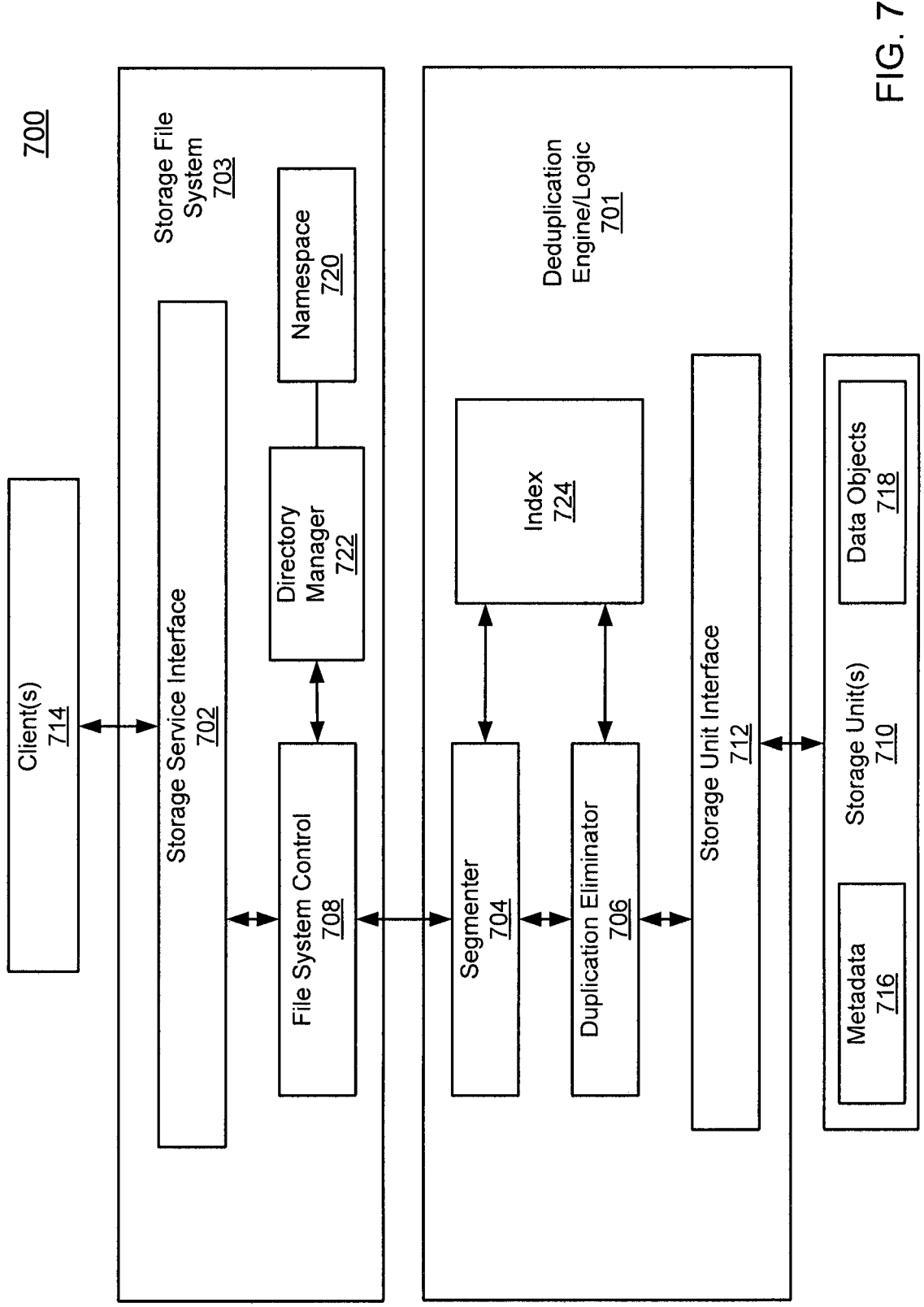
FIG. 7 is a block diagram illustrating a deduplication storage system in which poor deduplication files can be identified according to one embodiment of the invention.

FIG. 7 is a block diagram illustrating a deduplication storage system according to one embodiment of the invention. For example, deduplication storage system 700 is implemented as part of the storage system 700 as described above, such as, for example, the deduplication storage system as a client and/or a server described above. In one embodiment, storage system 700 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 700 may have a distributed architecture, or all of its components may be integrated into a single unit. Storage system 700 may be implemented as part of an archive and/or backup system, or a disaster recovery system, such as a deduplicating storage system available from EMC® Corporation of Hopkinton, Mass.

In one embodiment, storage system 700 includes deduplication logic 701 interfacing one or more clients 714, via file system 703, with one or more storage units 710 storing metadata 716 and data objects 718. Clients 714 may be any kinds of clients, such as, for example, a client application, backup software, a garbage collector, or a storage management function, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 710 may be implemented locally (e.g., single node operating environment) or remotely (e.g., multi-node operating environment) via an interconnect, which may be a bus and/or a network (e.g., a storage network). In one embodiment, one of storage units 710 operates as an active storage to receive and store external or fresh user data from a client (e.g., an end-user client or a primary storage system associated with one or more end-user clients), while the another one of storage units 710 operates as a target storage unit to periodically archive data from the active storage unit according to an archiving policy or scheme.

Storage units 710 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 710 may also be combinations of such devices. In the case of disk storage media, the storage units 710 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 716, may be stored in at least some of storage units 710, such that files can be accessed independent of another storage unit. Metadata of each storage unit includes enough information to provide access to the files it contains. In one embodiment, metadata may include fingerprints or representatives contained within data objects 718, where a data object may represent a data segment (also referred to as a data chunk), a compression region (CR) of one or more data segments, or a container of one or more CRs. Fingerprints are mapped to a particular data object via metadata 716, enabling the system to identify the location of the data object containing a data segment represented by a particular fingerprint. A fingerprint may be generated based on at least a portion of a data segment, for example, by applying a predetermined mathematical algorithm (e.g., hash function) to at least a portion of the content of the data segment. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 716 may include a file name, a storage unit identifier (ID) identifying a storage unit in which the segments associated with the file name are stored, reconstruction information for the file using the segments, and any other appropriate metadata information. Metadata 716 may further include a segment ID, a segment sketch, a hash of a segment, an encrypted hash of a segment, random data, or any other appropriate metadata. In some embodiments, metadata associated with a segment is used to identify identical and/or similar data segments. The stored metadata enables a faster identification of identical and/or similar data segments as an ID and/or sketch (e.g., a set of values characterizing the segment) do not need to be recomputed for the evaluation of a given incoming data segment.

In one embodiment, a segment ID includes one or more deterministic functions of a data segment (also referred to as a data segment), one or more hash functions of a data segment, random data, or any other appropriate data segment ID. In various embodiments, a data segment sketch includes one or more deterministic functions of a data segment, one or more hash functions of a data segment, one or more functions that return the same or similar value for the same or similar data segments (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a segment. For example, a sketch may be generated by applying one or more functions (e.g., hash functions) on a segment and a subset of the results of the functions performed on the segment (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, file system 703 includes file service interface 702, file system control logic 708, directory manager 722, and namespace 720. Deduplication logic 701 includes segmenter 704 (also referred to as a segmenting module or unit), duplication eliminator 706, and storage unit interface 712. File system control 708 receives a file or files (or data item(s)) via file service interface 702, which may be part of a file system namespace 720 of file system 703 associated with the deduplication logic 701. The file system namespace 720 refers to the way files are identified and organized in the system. An example is to organize the files hierarchically into directories or folders, which may be managed by directory manager 722. File service interface 712 supports a variety of protocols, including a network file system (NFS), a common Internet file system (CIFS), a direct access file system (DAFS), Hadoop distributed file system (HDFS), and a virtual tape library interface (VTL), etc.

The file(s) is/are processed by segmenter 704 and file system control 708. Segmenter 704, also referred to as a content store, breaks the file(s) into variable-length segments based on a variety of rules or considerations. For example, the file(s) may be broken into segments by identifying segment boundaries. Segment boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more segments that originally made up a data block, data stream, file, or directory that was/were previously stored.

In some embodiments, segments are segmented by identifying segment boundaries that are content-based, such as, for example, a hash function is applied to values of data within a sliding window through the data stream or block and when the hash function is equal to a value (or equal to one of several values) then a segment boundary is identified. In various embodiments, segment boundaries are identified using content based functions operating on a sliding window within a data stream or block that have a minimum or maximum or other value or any other appropriate content based segmenting algorithm. In various embodiments, segments include fixed-length segments, variable length segments, overlapping segments, non-overlapping segments, segments with a minimum size, segments with a maximum size, or any other appropriate segments. In various embodiments, segments include files, groups of files, directories, a portion of a file, a portion of a data stream with one or more boundaries unrelated to file and/or directory boundaries, or any other appropriate segment.

In one embodiment, a segment boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, file system control 708, also referred to as a file system manager, processes information to indicate the segment(s) association with a file. In some embodiments, a list of fingerprints is used to indicate segment(s) associated with a file. File system control 708 passes segment association information (e.g., representative data such as a fingerprint) to index 724. Index 724 is used to locate stored segments in storage units 710 via storage unit interface 712. In one embodiment, index 724 may include multiple entries, each entry corresponding one of the deduplicated segments. Each entry maps a representative or fingerprint of a deduplicated segment to a storage location identifier identifying a storage location storing the corresponding deduplicated segment. In one embodiment, each entry of index 724 maps a fingerprint of a segment to a container identifier identifying a container that contains the corresponding segment.

In one embodiment, index 724 includes a persistent hash-table of segment-IDs keyed either by the digest of the data stored in the segment or by the deduplication key of the data stored in the segment. The index 724 need not contain entries for every data segment in the deduplication domain, but the effectiveness of deduplication is a function of the number of entries stored in the index 724. Deduplication of data happens in two logically distinct operations: detection and remapping. The detection operation identifies blocks containing the same data. The remapping operation updates address maps that record physical locations of logical units of data so that a single block of data is shared by multiple logical units (LUNs) or by multiple positions within the same LUN. Detection is accomplished by building a database (e.g., index 724) that maintains a digest (e.g., SHA, checksum) and a deduplication key for each data block. When two data blocks have the same digest they have a sufficiently high probability of containing the same data to warrant a bit-for-bit comparison to confirm they are exact duplicates. Remapping leverages dynamic block-mapping technology of a file system mapping driver. A file system allows dynamic manipulation of the address maps that connects LUN's logical address space to its physical address space.

Duplication eliminator 706, also referred to as a segment store, identifies whether a newly received segment has already been stored in storage units 710. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 710 that make up the file. Segments are then packed by a container manager (which may be implemented as part of storage unit interface 712) into one or more storage containers stored in storage units 710. The deduplicated segments may be further compressed into one or more CRs using a variation of compression algorithms, such as a Lempel-Ziv algorithm before being stored. A container may contain one or more CRs and each CR may contain one or more deduplicated segments (also referred to deduplicated segments). A container may further contain the metadata such as fingerprints, sketches, type of the data segments, etc. that are associated with the data segments stored therein.

When a file is to be retrieved, file service interface 702 is configured to communicate with file system control 708 to identify appropriate segments stored in storage units 710 via storage unit interface 712. Storage unit interface 712 may be implemented as part of a container manager. File system control 708 communicates (e.g., via segmenter 704) with index 724 to locate appropriate segments stored in storage units via storage unit interface 712. Appropriate segments are retrieved from the associated containers via the container manager and are used to construct the requested file. The file is provided via interface 702 in response to the request. In one embodiment, file system control 708 utilizes a tree (e.g., a segment tree obtained from namespace 720) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

In one embodiment, storage system 700 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Note that some or all of the components as shown and described above (e.g., deduplication logic 701) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into a dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
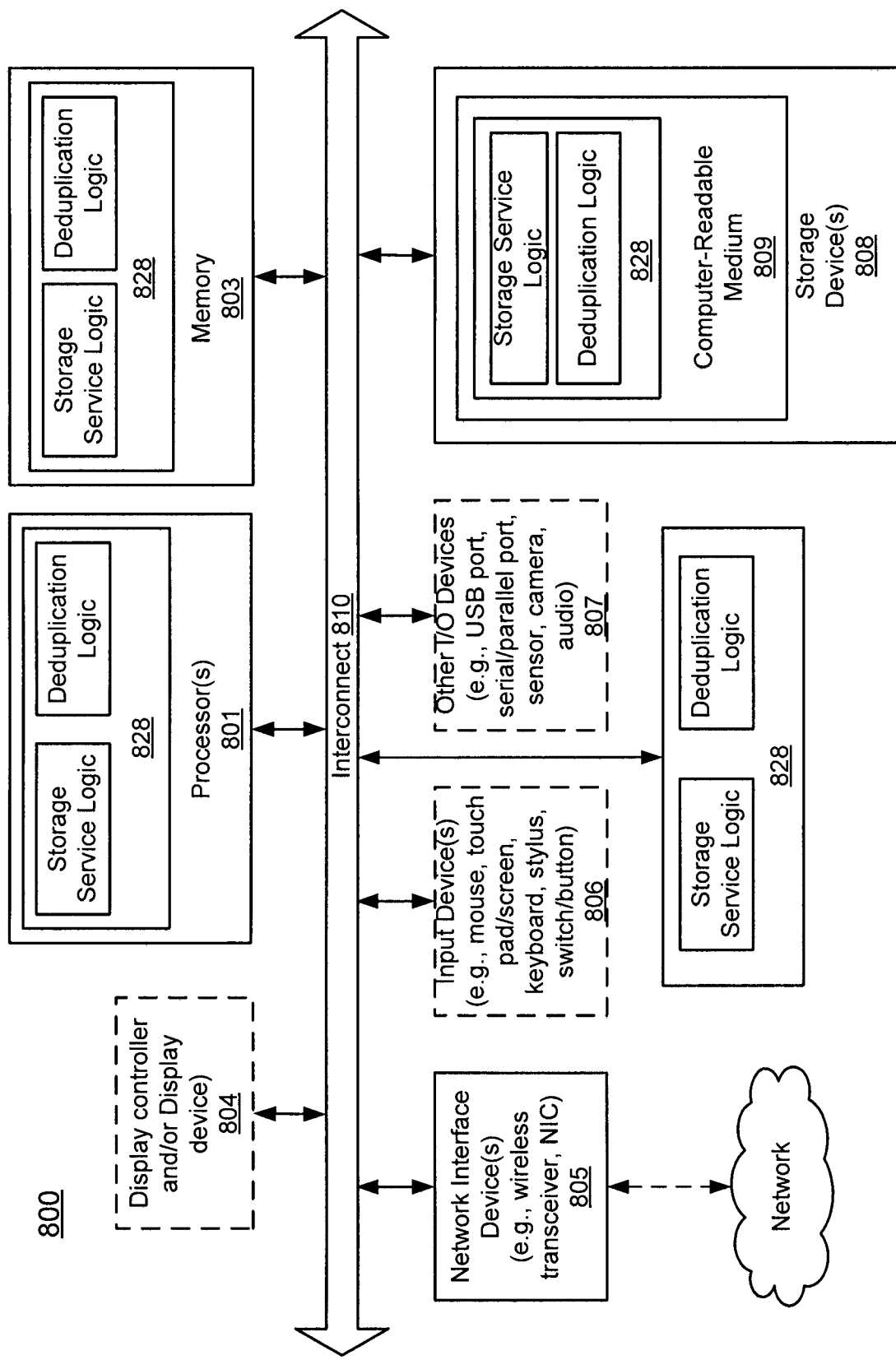
FIG. 8 is a block diagram illustrating a data processing system in which poor deduplication files can be identified according to one embodiment of the invention.

FIG. 8 is a block diagram illustrating an example of a data processing system that may be used with one embodiment of the invention. For example, system 800 may represents any of data processing systems described above performing any of the processes or methods described above. System 800 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 800 is intended to show a high level view of many components of the computer system. However, it is to be understood that additional components may be present in certain implementations and furthermore, different arrangement of the components shown may occur in other implementations. System 800 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 800 includes processor 801, memory 803, and devices 805-808 via a bus or an interconnect 810. Processor 801 may represent a single processor or multiple processors with a single processor core or multiple processor cores included therein. Processor 801 may represent one or more general-purpose processors such as a microprocessor, a central processing unit (CPU), or the like. More particularly, processor 801 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 801, which may be a low power multi-core processor socket such as an ultra-low voltage processor, may act as a main processing unit and central hub for communication with the various components of the system. Such processor can be implemented as a system on chip (SoC). Processor 801 is configured to execute instructions for performing the operations and steps discussed herein. System 800 may further include a graphics interface that communicates with optional graphics subsystem 804, which may include a display controller, a graphics processor, and/or a display device.

Processor 801 may communicate with memory 803, which in one embodiment can be implemented via multiple memory devices to provide for a given amount of system memory. Memory 803 may include one or more volatile storage (or memory) devices such as random access memory (RAM), dynamic RAM (DRAM), synchronous DRAM (SDRAM), static RAM (SRAM), or other types of storage devices. Memory 803 may store information including sequences of instructions that are executed by processor 801, or any other device. For example, executable code and/or data of a variety of operating systems, device drivers, firmware (e.g., input output basic system or BIOS), and/or applications can be loaded in memory 803 and executed by processor 801. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 800 may further include IO devices such as devices 805-808, including network interface device(s) 805, optional input device(s) 806, and other optional IO device(s) 807. Network interface device 805 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 806 may include a mouse, a touch pad, a touch sensitive screen (which may be integrated with display device 804), a pointer device such as a stylus, and/or a keyboard (e.g., physical keyboard or a virtual keyboard displayed as part of a touch sensitive screen). For example, input device 806 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 807 may include an audio device. An audio device may include a speaker and/or a microphone to facilitate voice-enabled functions, such as voice recognition, voice replication, digital recording, and/or telephony functions. Other IO devices 807 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 807 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 810 via a sensor hub (not shown), while other devices such as a keyboard or thermal sensor may be controlled by an embedded controller (not shown), dependent upon the specific configuration or design of system 800.

To provide for persistent storage of information such as data, applications, one or more operating systems and so forth, a mass storage (not shown) may also couple to processor 801. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 801, e.g., via a serial peripheral interface (SPI). This flash device may provide for non-volatile storage of system software, including a basic input/output software (BIOS) as well as other firmware of the system.

Storage device 808 may include computer-accessible storage medium 809 (also known as a machine-readable storage medium or a computer-readable medium) on which is stored one or more sets of instructions or software (e.g., module, unit, and/or logic 828) embodying any one or more of the methodologies or functions described herein. Module/unit/logic 828 may also reside, completely or at least partially, within memory 803 and/or within processor 801 during execution thereof by data processing system 800, memory 803 and processor 801 also constituting machine-accessible storage media. Module/unit/logic 828 may further be transmitted or received over a network via network interface device 805.

Computer-readable storage medium 809 may also be used to store the some software functionalities described above persistently. While computer-readable storage medium 809 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 828, components and other features described herein can be implemented as discrete hardware components or integrated in the functionality of hardware components such as ASICS, FPGAs, DSPs or similar devices. In addition, module/unit/logic 828 can be implemented as firmware or functional circuitry within hardware devices. Further, module/unit/logic 828 can be implemented in any combination hardware devices and software components.

Note that while system 800 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for identifying files not to be deduplicated in a storage system with deduplication, the method comprising:
   arranging, by a poor compression module executed by one or more processors, a sequence of files in a predefined order that can be repeated and reversed;
   comparing, by the poor compression module, neighboring previous and next files in the arranged sequence of files in the predefined order to determine a count of different segments in the next file compared to the previous files in the sequence;
   classifying, by the poor compression module, the next file as a possible file to remove from deduplication if a percentage of the determined count of different segments in the next file exceeds a difference threshold;
   reversing, by the poor compression module, the predefined order in which the sequence of files is arranged;
   comparing, by the poor compression module, neighboring previous and next files in the arranged sequence of files in the reversed order to again determine the count of different segments in the next file compared to segments in the previous files in the sequence;
   declassifying, by the poor compression module, the next file as the possible file to remove from deduplication if the percentage of the again determined count of different segments in the next file is within the difference threshold; and
   deduplicating, by a deduplication logic executed by the one or more processors, files which are not classified as possible files to remove from deduplication.

2. The method of claim 1, wherein arranging the sequence of files in the predefined order that can be repeated and reversed is obtained using a BTree to index inodes of the sequence of files to define a persisted sequence of the files in the pre-defined order.

3. The computer-implemented method of claim 1, wherein segments in the next file and previous file(s) are counted based on bitmaps generated for each file in the sequence of files, the bitmaps representing segments belonging to the files in memory in a countable set of bits having a binary value of one or zero.

4. The computer-implemented method of claim 3, wherein to determine the count of different segments in the next file compared to segments in the previous file includes:
   generating a combined bitmap representing unique segments collectively belonging to the neighboring previous and next files in the sequence of files; and
   subtracting a count of a number of unique segments represented in the previous file's bitmap from a count of a number of unique segments represented in the combined bitmap to reveal the count of different segments in the next file compared to the previous file.

5. The computer-implemented method of claim 4, wherein generating the combined bitmap representing unique segments collectively belonging to the neighboring previous and next files in the sequence of files is taking a union of a bitmap for the previous file and the next file.

6. The computer-implemented method of claim 3 further comprising generating the bitmap using a bloom filter, the generating including:
   receiving a selection of the N files for which files that do not duplicate are to be identified;
   determining that a file is one of the files in the N files;
   traversing segments belonging to the file;
   sampling one of every R segments traversed; and
   inserting each sampled one of every R segments into the bitmap using the bloom filter.

7. A non-transitory computer-readable storage medium having instructions stored therein, which when executed by a processor, cause the processor to perform operations for identifying files that do not deduplicate in a storage system with deduplication, the operations comprising:
   arrange a sequence of files in a predefined order that can be repeated and reversed;

compare neighboring previous and next files in the arranged sequence of files in the predefined order to determine a count of different segments in the next file compared to the previous files in the sequence;
classify the next file as a possible file to remove from deduplication if a percentage of the determined count of different segments in the next file exceeds a difference threshold;
reverse the predefined order in which the sequence of files is arranged;
compare neighboring previous and next files in the arranged sequence of files in the reversed order to again determine the count of different segments in the next file compared to segments in the previous files in the sequence;
declassify the next file as the possible file to remove from deduplication if the percentage of the again determined count of different segments in the next file is within the difference threshold; and
deduplicate files which are not classified as possible files to remove from deduplication.

8. The non-transitory computer-readable storage medium of claim 7, wherein to arrange the sequence of files in the predefined order that can be repeated and reversed is to obtain a BTree to index inodes of the sequence of files to define a persisted sequence of the files in the pre-defined order.

9. The non-transitory computer-readable storage medium of claim 7, wherein segments in the next file and previous file(s) are counted based on bitmaps generated for each file in the sequence of files, the bitmaps representing segments belonging to the files in memory in a countable set of bits having a binary value of one or zero.

10. The non-transitory computer-readable storage medium of claim 7, wherein to determine the count of different segments in the next file compared to segments in the previous file(s) includes to:
generate a combined bitmap representing unique segments collectively belonging to the neighboring previous and next files in the sequence of files; and
subtract a count of a number of unique segments represented in the previous file's bitmap from a count of a number of unique segments represented in the combined bitmap to reveal the count of different segments in the next file compared to the previous file(s).

11. The non-transitory computer-readable storage medium of claim 10, wherein to generate the combined bitmap representing unique segments collectively belonging to the neighboring previous and next files in the sequence of files is taking a union of a bitmap for the previous file(s) and the next file.

12. The non-transitory computer-readable storage medium of claim 9, further comprising operations to:
generate the bitmap using a bloom filter, including to:
receive a selection of the N files for which files that do not duplicate are to be identified;
determine that a file is one of the files in the N files;
traverse segments belonging to the file;
sample one of every R segments traversed; and
insert each sampled one of every R segments into the bitmap using the bloom filter.

13. A data processing system, comprising:
a memory in which to store a bitmap for each file in a subset of files, and a repository for storing information identifying which files in the subset of files that do not compress;
a processor in communication with the memory, the processor configured to:
arrange a sequence of files in a predefined order that can be repeated and reversed;
compare neighboring previous and next files in the arranged sequence of files in the predefined order to determine a count of different segments in the next file compared to the previous files in the sequence;
classify the next file as a possible file to remove from deduplication if a percentage of the determined count of different segments in the next file exceeds a difference threshold;
reverse the predefined order in which the sequence of files is arranged;
compare neighboring previous and next files in the arranged sequence of files in the reversed order to again determine the count of different segments in the next file compared to segments in the previous files in the sequence;
declassify the next file as the possible file to remove from deduplication if the percentage of the again determined count of different segments in the next file is within the difference threshold; and
deduplicate files which are not classified as possible files to remove from deduplication.

14. The data processing system of claim 13, wherein to arrange the sequence of files in the predefined order that can be repeated and reversed is to obtain a BTree to index inodes of the sequence of files to define a persisted sequence of the files in the pre-defined order.

15. The data processing system of claim 13, wherein to count segments in the next file and previous file(s) is based on bitmaps generated for each file in the sequence of files, the bitmaps representing segments belonging to the files in memory in a countable set of bits having a binary value of one or zero.

16. The data processing system of claim 15, wherein to determine the count of different segments in the next file as compared to segments in the previous file, the processor is to further:
generate a combined bitmap representing unique segments collectively belonging to the neighboring previous and next files in the sequence of files; and
subtract a count of a number of unique segments represented in the previous file's bitmap from a count of a number of unique segments represented in the combined bitmap to reveal the count of different segments in the next file compared to the previous file.

17. The data processing system of claim 16, wherein to generate the combined bitmap representing unique segments collectively belonging to the neighboring previous and next files in the sequence of files, the processor is to take a union of a bitmap for the previous file and the next file.

18. The data processing system of claim 15, wherein the processor is further to generate the bitmap using a bloom filter, including to:
receive a selection of the N files for which files that do not duplicate are to be identified;
determine that a file is one of the files in the N files;
traverse segments belonging to the file;
sample one of every R segments traversed; and
insert each sampled one of every R segments into the bitmap using the bloom filter.

* * * * *